(12) United States Patent
Brewington

(10) Patent No.: US 7,472,549 B2
(45) Date of Patent: Jan. 6, 2009

(54) MONOCOQUE TURBO-GENERATOR

(76) Inventor: Doyle W. Brewington, 6503 Bayonne Dr., Northampton Spring, TX (US) 77389

( * ) Notice: Subject to any disclaimer, the term of this patent is extended or adjusted under 35 U.S.C. 154(b) by 422 days.

(21) Appl. No.: 11/222,961

(22) Filed: Sep. 12, 2005

(65) Prior Publication Data

US 2007/0056285 A1 Mar. 15, 2007

(51) Int. Cl.
*F03G 7/00* (2006.01)
(52) U.S. Cl. .................................................. 60/641.2
(58) Field of Classification Search ...... 60/641.2–641.5
See application file for complete search history.

(56) References Cited

U.S. PATENT DOCUMENTS

| | | | |
|---|---|---|---|
| 3,638,720 A | 2/1972 | Thomas | |
| 3,755,076 A | 8/1973 | Lindsley | |
| 3,827,243 A | 8/1974 | Paull et al. | |
| 3,874,174 A | * 4/1975 | Greene | 60/641.2 |
| 3,938,334 A | 2/1976 | Matthews | |
| 3,938,335 A | 2/1976 | Marwick | |
| 3,974,394 A | 8/1976 | Bailey | |
| 3,986,362 A | 10/1976 | Baciu | |
| 3,988,896 A | * 11/1976 | Matthews | 60/641.4 |
| 4,023,136 A | 5/1977 | Lamensdorf et al. | |
| 4,100,744 A | 7/1978 | De Munari | |
| 4,107,987 A | 8/1978 | Robbins et al. | |
| 4,123,269 A | * 10/1978 | Von Hoene et al. | 430/60 |
| 4,144,715 A | 3/1979 | Fleck et al. | |
| 4,201,060 A | * 5/1980 | Outmans | 60/641.2 |
| 4,285,401 A | 8/1981 | Erickson | |
| 4,291,232 A | 9/1981 | Cardone et al. | |
| 4,372,386 A | 2/1983 | Rhoades et al. | |
| 4,380,903 A | 4/1983 | Matthews | |
| 4,386,499 A | 6/1983 | Raviv et al. | |
| 4,407,126 A | 10/1983 | Aplene | |
| 4,896,725 A | 1/1990 | Parker et al. | |
| 4,899,534 A | 2/1990 | Sorenson | |
| 4,912,941 A | 4/1990 | Buchi | |
| 5,058,386 A | 10/1991 | Senanayake | |
| 5,099,648 A | 3/1992 | Angle | |
| 5,513,573 A | 5/1996 | Sutton | |
| 6,259,165 B1 | 7/2001 | Brewington | |

FOREIGN PATENT DOCUMENTS

| | | |
|---|---|---|
| DE | 498700 | 5/1930 |
| DE | 2918001 | 11/1980 |
| FR | 2520448 | 1/1982 |

* cited by examiner

*Primary Examiner*—Hoang M Nguyen
(74) *Attorney, Agent, or Firm*—KED & Associates, LLP

(57) ABSTRACT

A monocoque turbo-generator device is provided that is capable of cooling and lubricating itself and providing a non-leaking magnetic drive system that maintains the leak proof integrity of the device. This may be accomplished using propellant gases of the turbine as they process through the monocoque chamber. The monocoque turbo-generator device may produce electricity within an enclosed leak proof capsule with accessories that allow the energy to be tapped from the outside of its monocoque casing.

22 Claims, 9 Drawing Sheets

MONOCOQUE TURBO-GENERATOR

BACKGROUND

Embodiments of the present invention may relate to electrical power generation. More particularly, embodiments of present invention may relate to a self-contained, self-cooling and self-lubricating power generating device.

SUMMARY

Embodiments of the present invention may provide an apparatus and method for cooling a generator and for lubricating turbine and generator bearings of a turbo-generator assembly within a sealed compartment. The sealed compartment may hereafter be referred to as a monocoque compartment. The turbo-generator assembly within the sealed compartment may have an exhaust exit, rather than a protruding rotating shaft. The exhaust exit may be a sealed tubular array or a fixed exhaust plenum. The turbo-generator assembly may work in vertical or horizontal positions, for example, or may operate in other positions.

Embodiments of the present invention may allow practical installations of down hole turbo-generators and/or turbo-generator systems that may be installed within hostile (temperature or chemical) environments on the Earth's surface or in space.

Embodiments of the present invention may utilize a dual nature of certain materials in a closed loop sealed system in which the certain materials may be used as lubricants and coolant gases within the same sealed compartments such as where air and/or oxygen is substantially absent.

Embodiments of the present invention may provide a sealed modular unit that may be installed within any closed loop system designed to generate electricity based on a heat source (and/or include a condensing system).

Embodiments of the present system may provide a low cost alternative power generating device for closed loop circuit generators through the ability of ease of mass production and adaptation to generating systems.

Embodiments of the present system may provide ease and speed of assembly for closed loop generating devices since a monocoque assembly may be adaptable to closed loop assemblies having a heat exchange device (or system) on one end of the monocoque assembly and a condensing device (or system) on the other end of the monocoque assembly.

Other objects, advantages and salient features of the invention may become apparent from the following detailed description taken in conjunction with the annexed drawings, which disclose preferred embodiments of the invention.

BRIEF DESCRIPTION OF THE DRAWINGS

The foregoing and a better understanding of embodiments of the present invention may become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only, and that the invention may not be limited thereto.

Arrangements and embodiments of the present invention may be described with reference to the following drawings in which like reference numerals represent like elements and wherein.

DETAILED DESCRIPTION

Figure 1:
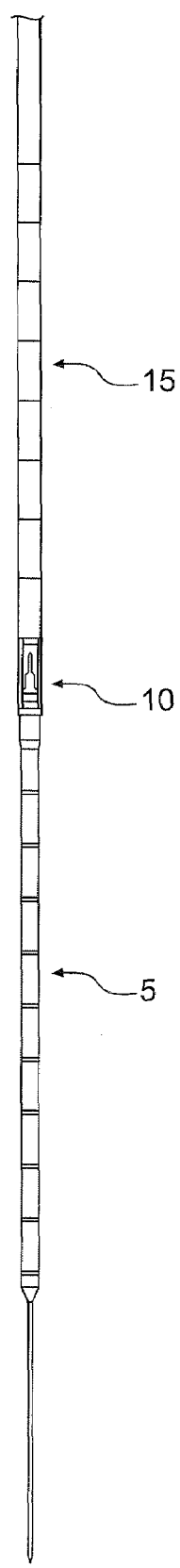
FIG. 1 shows a power generating apparatus according to an example embodiment of the present invention.

In the following detailed description, like reference numerals and characters may be used to designate identical, corresponding or similar components in differing figure drawings. Further, in the detailed description to follow, example sizes/models/values/ranges may be given although the present invention is not limited to the same. Where specific details are set forth in order to describe example embodiments of the invention, it should be apparent to one skilled in the art that the invention can be practiced without these specific details. Various elements may be shown in various ones of the figures. However, descriptions of various elements may only be provided with respect to specific figures for ease of discussion.

Embodiments of present invention may relate to a self-contained, self-cooling and self-lubricating power generating device as may be used on and/or with a "geomagmatic" Power Tube, such as described in U.S. Pat. No. 6,259,165, the subject matter of which is incorporated herein by reference. For example, U.S. Pat. No. 6,259,165 describes an apparatus that may hereafter be referred to as a Power Tube. The Power Tube may include a boiler module, a turbine module, a condenser module and a generator module coupled together as a unitary assembly, for example.

Embodiments of the present invention may hereafter be referred to as a monocoque turbo-generator and/or monocoque turbo-generator device, system and/or assembly. The monocoque turbo-generator may be used as a power plant for the Power Tube and/or power plants whose propellant fuel may be categorized as lubricants contained within a sealed unit that may be self-lubricating and/or self-cooling.

U.S. Pat. No. 6,259,165 includes embodiments that relate to a below-the-surface power generating device (i.e., a device called Power Tube) that may convert heat energy of the Earth to electrical energy. One factor for this type of energy generating device and/or other types of energy generating device may be cooling of the generator as well as lubrication of the generator and turbine bearings. In order to accomplish cooling and lubrication, a same propellant may be used to rotate the Power Tube turbine. This may be a mixture of iso-pentane and iso-butane (c-4 and c-5 on the petrochemical table) or any other chemical combination that may serve as both a propellant and a lubricant.

Installing a "shaft linked" turbo-generator system in a monocoque (i.e., a sealed unitary casing) may eliminate or reduce problems relating to leakage of rotary seals that may occur when a shaft from a turbine (in rotation) is mechanically and/or jointly attached to a generator. Additionally, as a generator rotates within a sealed environment (i.e., a monocoque casing) while attached to the turbine within a sealed (monocoque) casing, the generator may generate heat that may need to be removed. The monocoque turbo-generator capsule may be positioned vertically or horizontally, for example, although other positions and arrangements are also possible.

Furthermore, the turbine and generator bearings within the monocoque casing may require lubrication since the lubrication may not be provided by pumping systems that utilize lubricant reservoirs, which may require lubricant cooling due to environmental temperatures. The bearings may be a set of thrust and centering bearings, one each for the generator and turbine, with also an additional "safety" bearing when operating in the vertical position, for example.

By placing the turbo-generator system within a monocoque housing and allowing propellant gas to permeate the monocoque compartment as it exhausts through the turbine, the bearings of both the turbine and the generator may be lubricated since the turbine and generator may be installed in such a manner to permit circulation of exhausting mist in their area of rotation.

As the turbine releases the previously compressed exhaust gas into the monocoque chamber, the expansion of the gas may drop an appreciable number of degrees. This temperature drop may assist in the cooling of the generator within the same monocoque compartment as the gas flows toward the exiting and condensing side of the generating device through a sealed tubular or non-rotating exhaust plenum affixed between the monocoque turbo-generator device and the condensing system.

FIG. 1 shows a power generating apparatus according to an example embodiment of the present invention. Other embodiments and configurations are also within the scope of the present invention. As shown, the power generating apparatus may include a heat exchange device 5, a monocoque turbo-generator device 10 and a condensing device 15. The heat exchange device 5 and the condensing device 15 may generally correspond in operation with similar devices as described in U.S. Pat. No. 6,259,165. Overall operations of each of the heat exchange device 5, the turbine, the generator and the condensing device 15 may be understood from U.S. Pat. No. 6,259,165.

Figure 2:
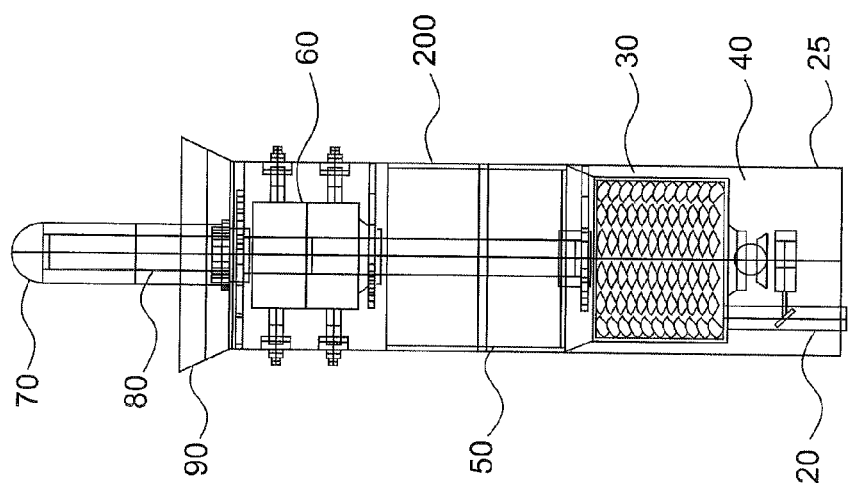
FIG. 2 shows a monocoque turbo-generator device according to an example of the embodiment of the present invention.

FIG. 2 shows a monocoque turbo-generator device according to an example embodiment of the present invention. Other embodiments and configurations are also within the scope of the present invention. The features shown in FIG. 2 may generally correspond to the monocoque turbo-generator device 10 shown in FIG. 1. FIG. 2 shows a monocoque turbo-generator device design matrix. The monocoque turbo-generator device includes a turbine 30 and a generator 60 mounted on a drive shaft 80 within a monocoque sealed shell 200.

Figure 3:
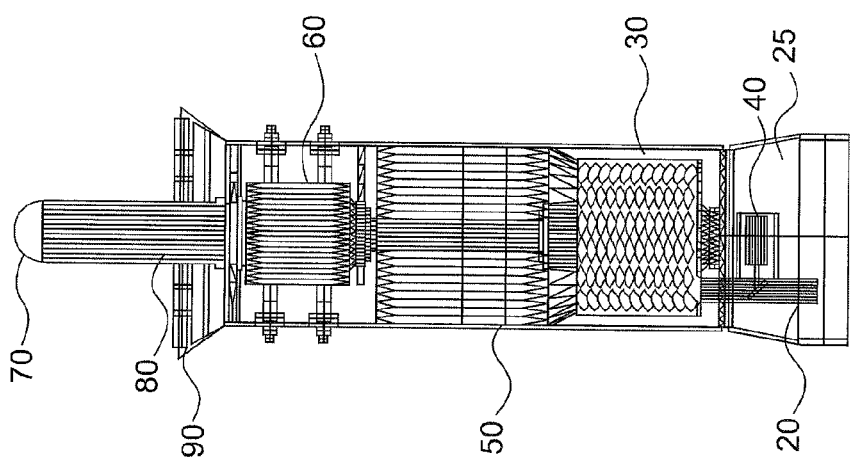
FIG. 3 is another view of the monocoque turbo-generator device according to an example embodiment of the present invention.

FIG. 3 shows another view of the monocoque turbo-generator device according to an example embodiment of the present invention. Other embodiments and configurations are also within the scope of the present invention. The features shown in FIG. 3 may generally correspond to the monocoque turbo-generator device 10 shown in FIG. 1. In FIG. 3, the monocoque sealed shell 200 has been removed from the FIG. 2 view for better illustration. As shown in FIG. 2 and/or FIG. 3, a heat exchange feed line 20 may bring iso-pentane/iso-butane propellant material to the turbine 30 in a high pressure gas form after being heated by the geomagmatic Earth in the heat exchange unit 5 (of FIG. 1). The heat exchange feed line 20 may be provided within a heat exchange interface case 25 and couple with the heat exchange device 5. The rate of gas flow may be controlled by a servo throttle control 40 to speed up or slow down rotation of the turbine 30. As one example, the turbine 30 may operate at speeds of 7200 to 20,000 RPM, although other speeds are also within the scope of the present invention.

Figure 4:
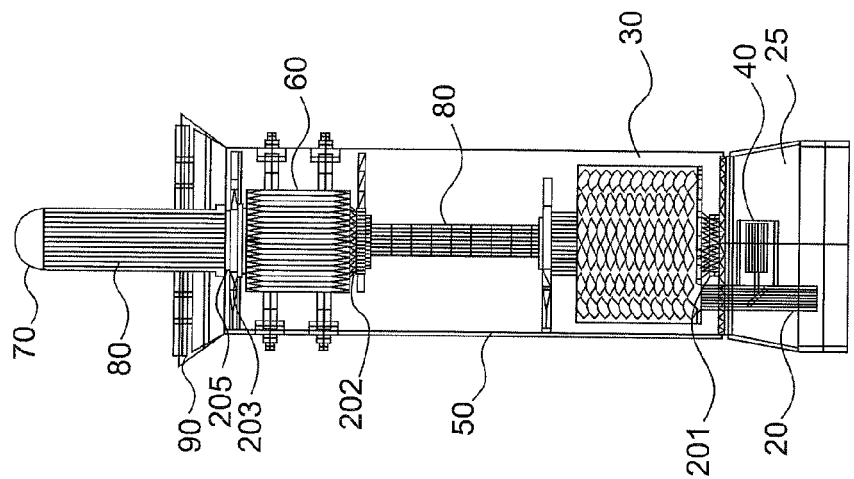
FIG. 4 is still another view of the monocoque turbo-generator device according to an example embodiment of the present invention.
Figure 5:
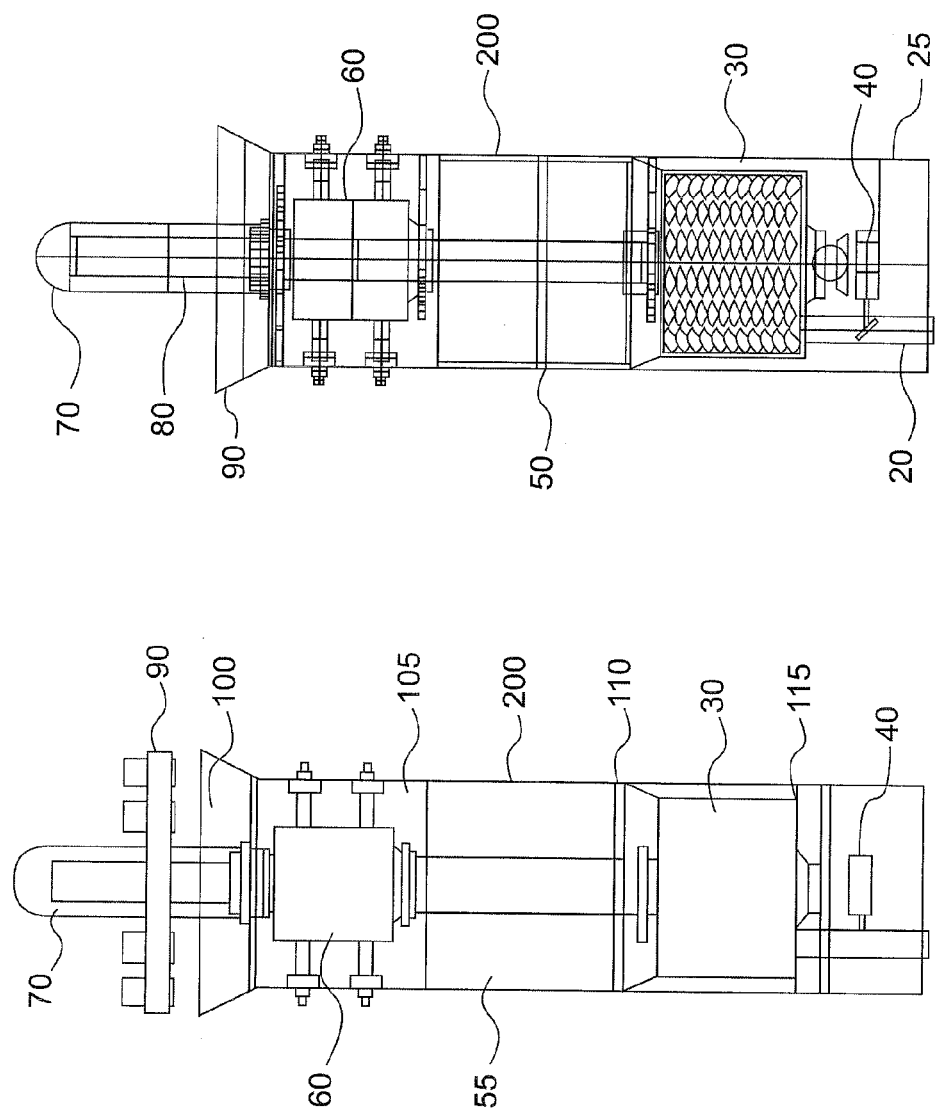
FIG. 5 is another view of the monocoque turbo-generator device according to an example embodiment of the present invention.

FIG. 4 shows another view of the monocoque turbo-generator device according to an example embodiment of the present invention. FIG. 5 shows still another view of the monocoque turbo-generator device according to an example embodiment of the present invention. Other embodiments and configurations are also within the scope of the present invention. The features shown in FIGS. 4 and 5 may generally correspond to the monocoque turbo-generator device 10 shown in FIG. 1.

In FIG. 4, a traverse tube tunnel 50 has been removed from the previous views for better illustration. FIG. 4 shows an exposed drive shaft 80 on which the turbine 30, the generator 60 and an upper level magnetic coupling shaft dome 70 may be mounted to form a single rotating unit that rotate at a same speed. FIG. 4 also shows various bearings within the sealed shell 200 such as thrust and centering bearing 201 located at the turbine 30, thrust and centering bearing 202 located at the generator 60 and centering bearing 203. FIG. 4 also shows a base seal 205 located at an area where the drive shaft 80 protrudes from the sealed shell 200.

FIG. 5 shows porous bearing housings 110 and 115 provided at a top and a base of the turbine 30 and porous bearing housings 100 and 105 provided at a top and a base of the generator 60. The housings 100, 105, 110 and 115 may allow circulating vapors ejected from exhaust of the turbine 30 in the monocoque configuration (i.e., within the monocoque sealed shell 200) to permeate the bearing sections and lubricate the bearings with the iso-pentane/iso-butane gases. The iso-pentane/iso-butane gases may be petroleum distillates and therefore may be considered lubricants. The gases may flow out of the turbine 30, traverse an exhaust tunnel cavity 55 (between the turbine 30 and the generator 60) and wash over the generator 60 toward an exit, such as multiple exhaust tube plenums 90. The exhaust tunnel cavity 55 may also be referred to as an expansion chamber. The exhaust tube plenum 90 may take the gases into the condensing device 15, such as a condensing module/chamber/system of the Power Tube, as described in U.S. Pat. No. 6,259,165. During this process, the propellant gas may permeate on all areas of the monocoque shell 200 and thereby lubricate the bearing system.

Figure 6:
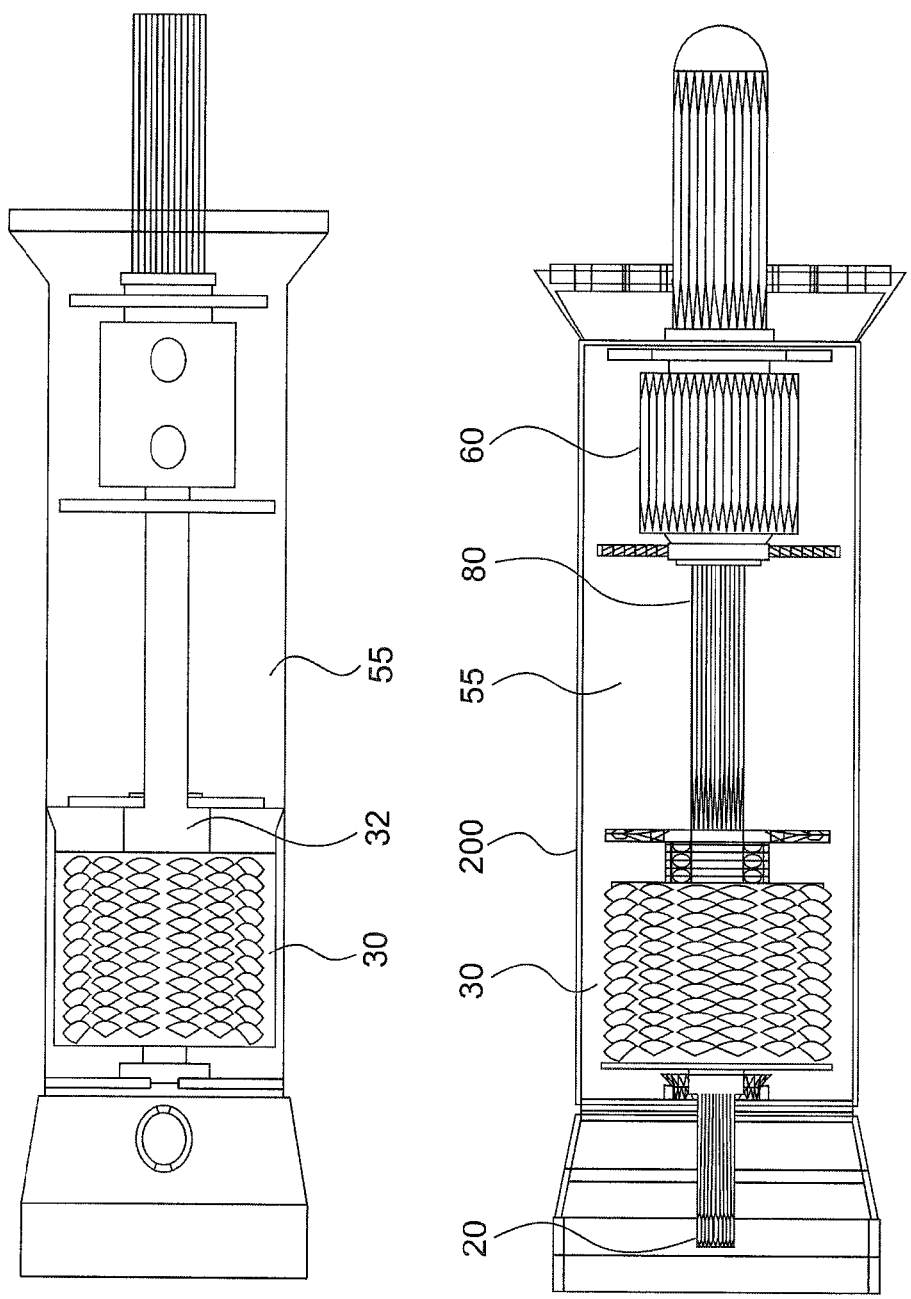
FIG. 6 is a side view of the monocoque turbo-generator device according to an example embodiment of the present invention.

FIG. 6 shows side views of the monocoque turbo-generator device according to example embodiments of the present invention. Other embodiments and configurations are also within the scope of the present invention. More specifically, FIG. 6 shows thermal gases flow and a method to cool the generator 60 and lubricate the bearings. More specifically, iso-pentane/iso-butane gases may enter the turbo-generator device from the heat exchange device 5. The gas may leave the turbine 30 at a turbine exhaust plenum 32. The once pressurized gas may expand through the monocoque chamber 200 which may drop the temperature of the gas by 100° F. or more. As the gas flows toward the generator 60 as shown by the arrows in FIG. 6, the gases may pick up accumulated heat manifest in a rotating generating body (i.e., the drive shaft 80) and may relieve the rotating body of some of that heat, and/or cool down the generator 60 with the propellant gas flow. The now higher temperature gas may flow out toward the condenser device 15.

Figure 7:
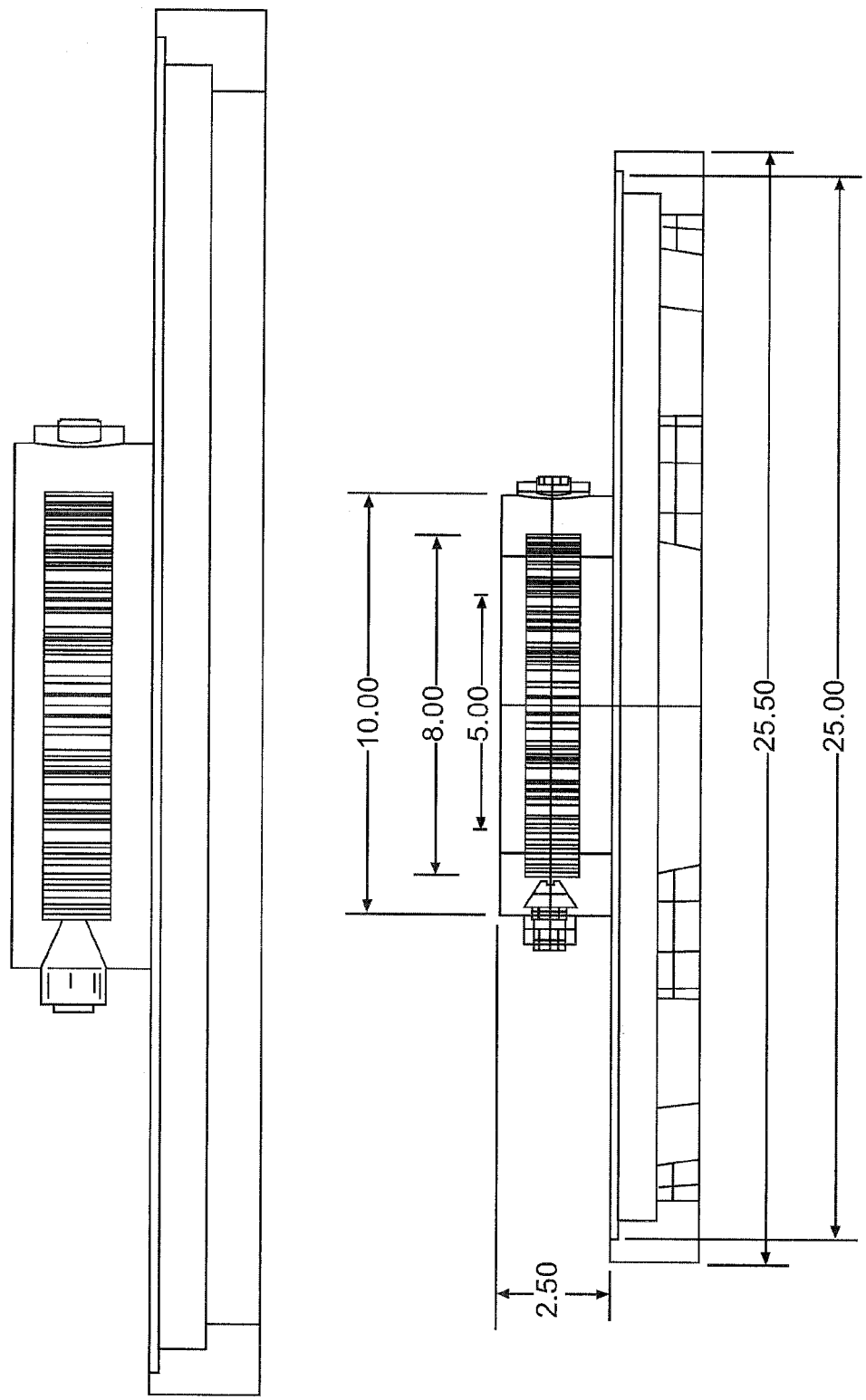
FIG. 7 is a side view of a top seal and magnetic coupling device according to an example embodiment of the present invention.

FIG. 7 is a side view of a top seal and magnetic coupling device according to an example embodiment of the present invention. Other embodiments and configurations are also within the scope of the present invention. More specifically, FIG. 7 shows an upper plate and air start magnetic coupler. The coupler may sit at a top of the pipe transfer cavity plenum and may contain a magnetic turbine unit such as for the Power Tube air start system. The air start turbine, when magnetically coupled to rods (e.g., samarium cobalt rods) contained within the casing of the extended shaft 80, may rotate due to magnetic drag exerted by the air start collar as high pressure air is applied to the air start intake adapter nozzle. This collar may start the rotation of the Power Tube unit as it powers up such as in areas where electrical energy is not present.

Figure 8:
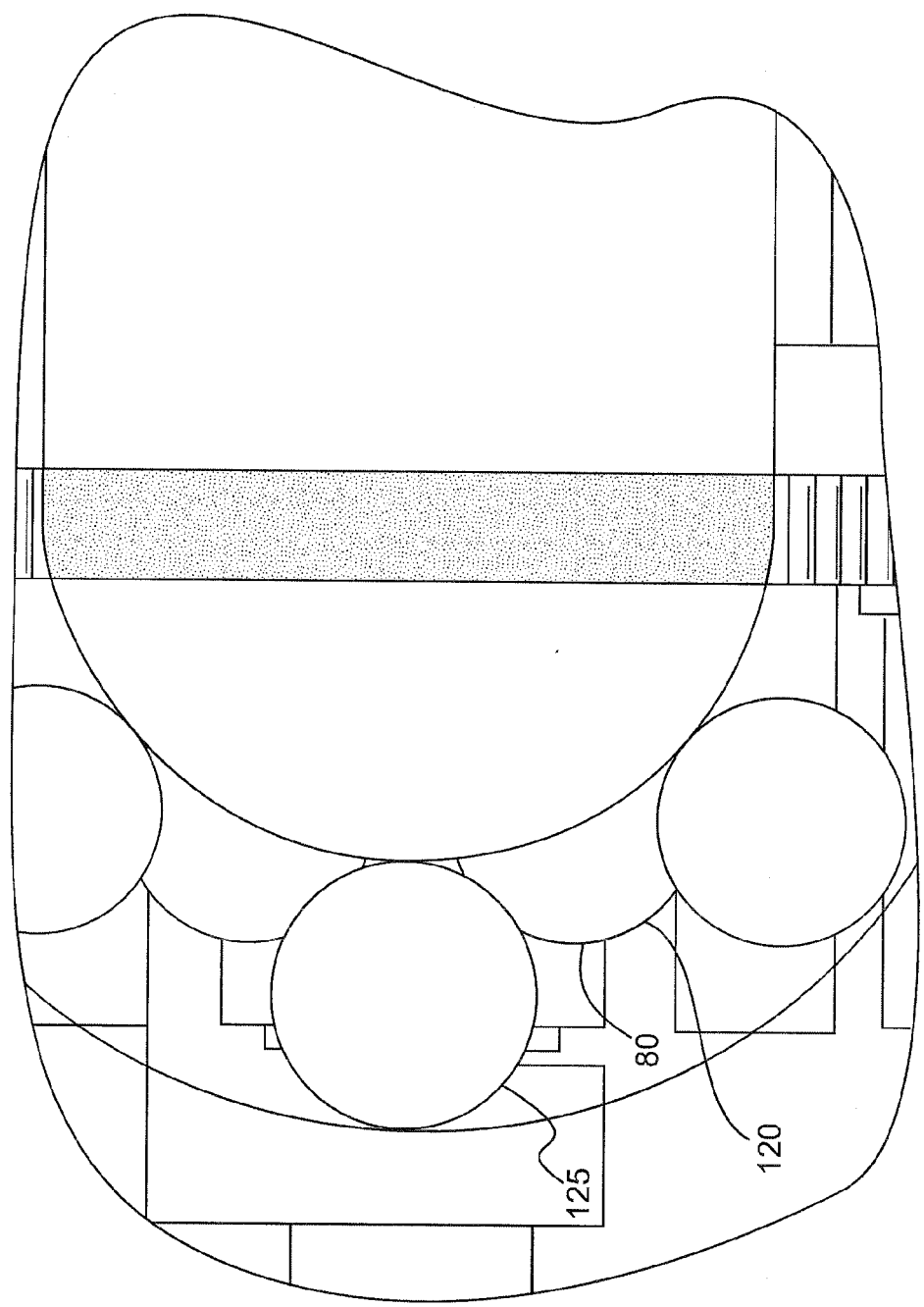
FIG. 8 is a side view of a lower end of the monocoque turbo-generator device according to an example embodiment of the present invention.

FIG. 8 is a side view of a lower end of the monocoque turbo-generator device according to an example embodiment of the present invention. Other embodiments and configurations are also within the scope of the present invention. This design may serve to support the shaft of the devices attached to it such as the turbine 30, the generator 60 and the magnetic coupling shaft 80. FIG. 8 shows thrust support bearings 120 supporting the rounded surface of the steel shaft 80 with a main center support bearing 125 available as a reserve in a vertical installation. Other numbers of thrust support bearings are also within the scope of the present invention.

Figure 9:
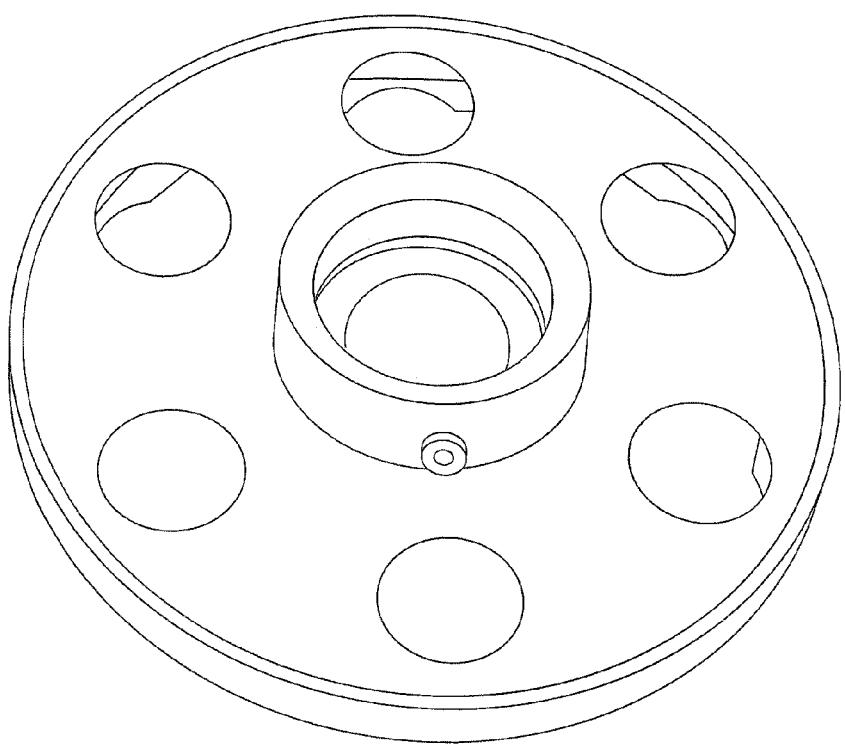
FIG. 9 is a view showing a superstructure seal plate of the monocoque housing according to an example embodiment of the present invention.

FIG. 9 is a view showing a superstructure seal plate of the monocoque housing according to an example embodiment of the present invention. More specifically, FIG. 9 shows a magnetically coupled air start ring above a top plate seal. Other embodiments and configurations are also within the scope of the present invention. The top plate seal may support the exit tubes that attach to the condenser device 15. The tube ports may be affixed and sealed to the top plate seal.

Figure 10:
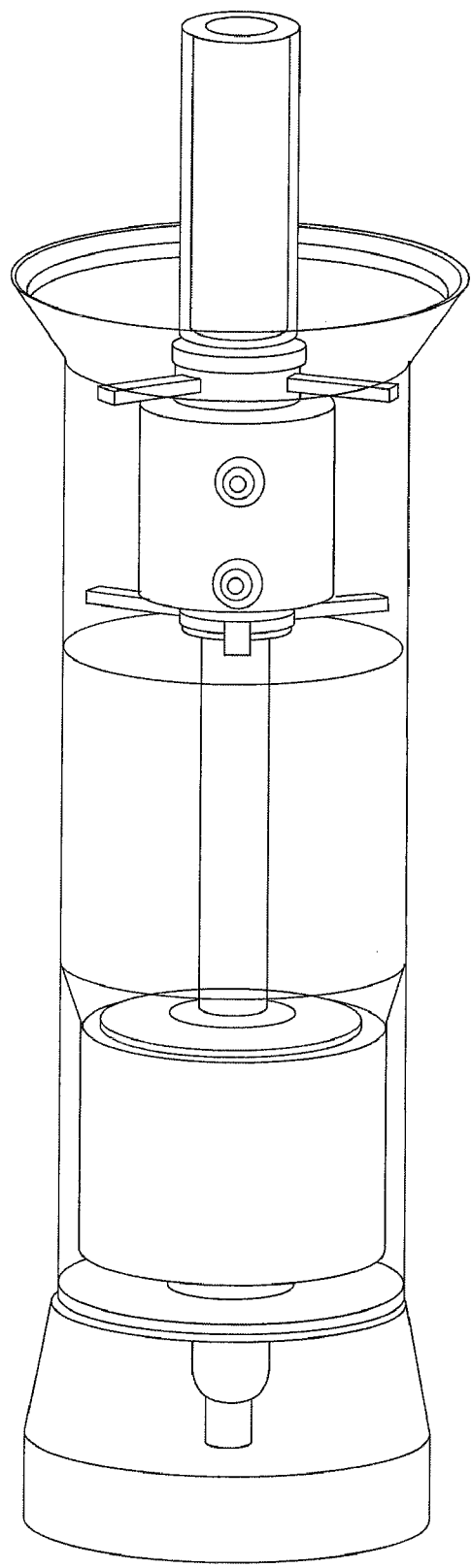
FIG. 10 shows temperature gradients within the monocoque structure according to an example embodiment of the present invention.

FIG. 10 shows temperature gradients that may take place within the monocoque structure according to an example embodiment of the present invention. Other embodiments, configurations and temperature gradients are also within the scope of the present invention. More specifically, FIG. 10 shows temperature gradients as iso-pentane/iso-butane gases pass through the cavity of the monocoque turbo-generator. The performance flow shows the high temperature at which the propellant may enter the turbine 30 and dropping temperatures as the propellant exits the turbine 30 and the cavity where additional gas expansion takes place dropping the temperature even further. The propellant gases flowing over the generator 60 may pick up the heat of the taking the heat out of the exit plenum that ties in to the condenser device 15. As the propellant material further cools, it may be pumped back in its liquid state through the heat exchange device 5 to repeat the cycle of energy release using the heat of the Earth.

Figure 11:
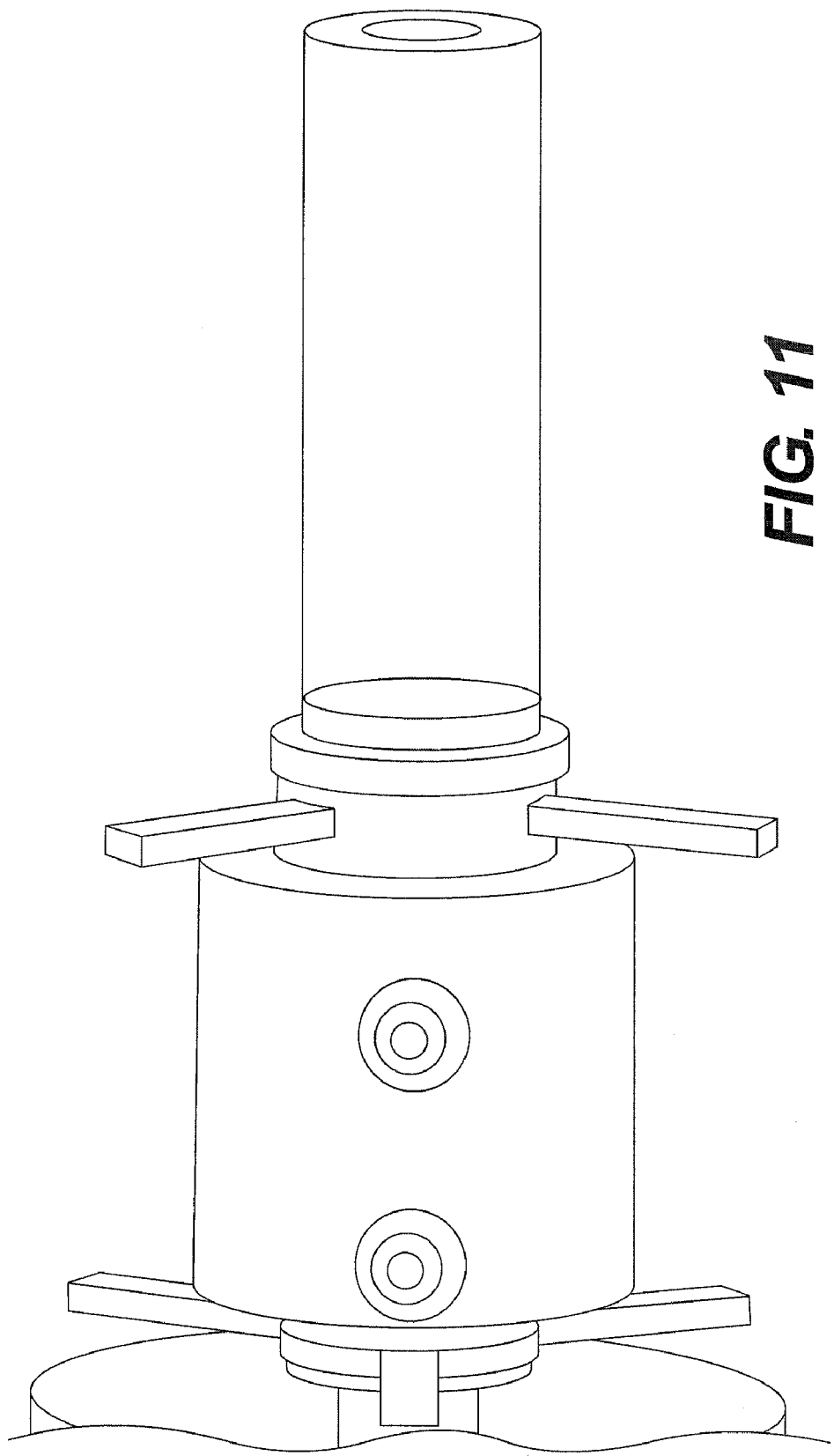
FIG. 11 is a view of a power end of the monocoque turbo-generator device according to an example embodiment of the present invention.

FIG. 11 is a view of a power end of the monocoque turbo-generator device according to an example embodiment of the present invention. Other embodiments and configurations are also within the scope of the present invention. More specifically, FIG. 11 shows generator output stanchions 140. There may be 4 stanchions, two on either side of the generator 60, although other numbers and locations are also within the scope of the present invention. They may include of a high insulation tube surrounding a copper rod, for example. Additionally the power output stanchions may also include a stainless steel jacket around the high insulation tube. The stanchions 140 may also be mounted with inner and outer seal washers through the casing of the monocoque turbo-generator device, eliminating or reducing the possibility of gas leakage and at the same time the arrangement may allow for the electrical energy being generated by the generator to be transferred outside of the monocoque case 200 in total safety ready to be attached to the supply cables. The protrusion of the magnetic coupling system is an example of another feature of the embodiment of the present invention and shows the sealing and seating of the assembly over the upper sealing plate assembly.

Embodiments of the present invention may provide a shaft, a turbine mounted to the shaft, a generator mounted to the shaft and a sealed shell housing the turbine and the generator. Propellant mixture may lubricate bearing systems and further cool the generator based on exhausted gases exiting from the turbine within the sealed shell. The exhaust vapors may derive from petrochemical base (c4 and c5 on the derivatives chart) and be considered lubricants to lubricate the bearing system of both the turbine and the generator as they are exposed within the monocoque chamber and encased in porous raceways, thus eliminating the need of separate lubrication that is commonly required for the bearing systems of this nature.

The monocoque turbo-generator system may be designed to function in heated environments underground for 60 months without servicing. The monocoque turbo-generator system may be designed to run in either horizontal or vertical configurations as it provides its own cooling and its own lubrication through the iso-pentane/iso-butane propellant that drives the system turbine. The design of the monocoque system is such that may connect all modules and parts between the Power Tube heat exchanger and the Power Tube condensing system. Still further, the porous nature of the monocoque turbo-generator system bearing raceways permit lubrication through natural absorption of the permeating pentane vapors as they flow toward the condensing side of the unit. A traverse tube tunnel may have a design to accelerate the molecular expansion rate of the gasses that pass through as they exhaust from the turbine toward the generator, thus increasing the cooling parameters of the flowing gas in the tube. The extended portion of the shaft may be mounted with a magnetic coupling system that allows the use of other magnetically coupled units such as fans or pumps to be driven by and on the same shaft that rotates the generator by the turbine, whose configuration and seals prevent leakage of the propellant outside the monocoque cavity as would be otherwise done if the shaft were extending through a seal-ring bearing.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structure.

What is claimed is:

1. A turbo-generator device comprising:
 a heat exchange device to obtain heat energy from the Earth and to heat a propellant mixture based on the obtained heat energy;
 a shaft;
 a turbine mounted to the shaft, to receive the heated propellant mixture and to provide exhausted gases that exit the turbine;
 a heat exchange feed line to provide the heated propellant mixture from the heat exchange device to the turbine;
 a generator, mounted to the shaft, to receive the exhausted gases from the turbine, the exhausted gases to cool the generator; and
 a sealed shell to house the turbine and the generator, wherein the propellant mixture to lubricate bearings within the sealed shell, and the exhausted gases exiting the turbine from within the sealed shell to cool the generator.

2. The turbo-generator device of claim 1, wherein the propellant mixture comprises one of iso-pentane and iso-butane.

3. The turbo-generator device of claim 1, further comprising a throttle valve control to regulate flow of the propellant mixture through the turbine.

4. The turbo-generator device of claim 1, further comprising a plurality of porous bearing casings containing centering and support bearings located at a base and a top of the generator and the turbine, respectively.

5. The turbo-generator device of claim 1, wherein the generator comprises a permanent magnet generator to generate DC current.

6. The turbo-generator device of claim 1, wherein the generator is sealed within the sealed shell except for bearing areas exposed to the exhausted gasses in the sealed shell.

7. The turbo-generator device of claim 1, wherein the turbine comprises one of a single or multi staged or in turbo expander format.

8. The turbo-generator device of claim 1, further comprising a traverse tunnel extending from a turbine exhaust plenum through an extension cavity that allows the exhausted gases to drop in temperature.

9. The turbo-generator device of claim 1, further comprising a base seal system located at an area where the shaft protrudes from the sealed shell.

10. The turbo-generator device of claim 9, wherein the base seal system comprises an exhaust plenum.

11. The turbo-generator device of claim 1, further comprising a condensing section.

12. The turbo-generator device of claim 1, wherein the generator and turbine are both provided within the same sealed shell that is permeated by the exhausted gases of the turbine.

13. The turbo-generator device of claim 1, wherein the exhausted gases exiting the turbine drop in temperature upon leaving the turbine and cool down the generator in the same shell.

14. An energy producing apparatus comprising:
 a heat exchange device to obtain heat energy from the Earth and to apply the heat energy to a mixture so as to raise a temperature of the mixture;
 a turbine device to receive the mixture from the heat exchange device and to provide exhausted gases based on the received mixture;
 a generator device, coupled to the turbine device by a shaft, to produce energy based on a rotation of the shaft; and
 a compartment to house the turbine device and the generator device, the mixture to lubricate portions of the turbine device and the generator device and the mixture to cool the generator device.

15. The energy producing apparatus of claim 14, wherein the turbine device and the generator device are both coupled to the shaft so as to rotate at equal speeds.

16. The energy producing apparatus of claim 14, wherein the mixture comprises one of iso-pentane and iso-butane.

17. The energy producing apparatus of claim 14, further comprising a heat exchange feed line to provide the mixture from the heat exchange device to the turbine device.

18. An energy producing device comprising:
 a heat exchange device to obtain heat energy from the Earth and to apply the heat energy to a mixture;
 a shaft;
 a turbine mounted to the shaft and the turbine to receive the mixture and the turbine to rotate the shaft based on the received mixture;
 a generator mounted to the shaft to produce electrical energy based on the rotated shaft; and
 a sealed shell to house the turbine and the generator, the energy producing device utilizing the mixture to lubricate and cool components within the sealed shell.

19. The energy producing device of claim 18, wherein the mixture comprises one of iso-pentane and iso-butane.

20. The energy producing device of claim 18, further comprising a heat exchange feed line to provide the mixture from the heat exchange device to the turbine.

21. The energy producing device of claim 18, wherein exhausted gases of the turbine drop in temperature upon leaving the turbine and cool down the generator in the same sealed shell that houses the turbine and the generator.

22. The turbo-generator device of claim 1, wherein the sealed shell to house the turbine and the generator so as to provide a self-cooling and self-lubricating device within the sealed shell.

* * * * *